(12) United States Patent
Tamm et al.

(10) Patent No.: US 10,074,963 B2
(45) Date of Patent: Sep. 11, 2018

(54) TANGENT SUSPENSION ACCESSORY ASSEMBLY AND ACCESSORY BRACKET THEREFOR

(71) Applicant: Classic Connectors, Inc., Trussville, AL (US)

(72) Inventors: Carl Russel Tamm, Trussville, AL (US); Randy L. Wolf, Trussville, AL (US)

(73) Assignee: Classic Connectors, Inc., Clinton, OH (US)

( * ) Notice: Subject to any disclaimer, the term of this patent is extended or adjusted under 35 U.S.C. 154(b) by 0 days.

(21) Appl. No.: 15/280,407

(22) Filed: Sep. 29, 2016

(65) Prior Publication Data
US 2017/0093138 A1    Mar. 30, 2017

Related U.S. Application Data

(60) Provisional application No. 62/234,621, filed on Sep. 29, 2015.

(51) Int. Cl.
*H02G 1/02* (2006.01)
*H02G 7/05* (2006.01)

(52) U.S. Cl.
CPC .............. *H02G 1/02* (2013.01); *H02G 7/053* (2013.01)

(58) Field of Classification Search
None
See application file for complete search history.

(56) References Cited

U.S. PATENT DOCUMENTS

| | | | | |
|---|---|---|---|---|
| 733,755 A | * | 7/1903 | Schickluna | H02G 7/20 174/169 |
| 1,871,336 A | * | 8/1932 | Miller | H02G 7/053 174/42 |
| 2,887,669 A | * | 5/1959 | Joseph | H01R 4/38 403/391 |
| 2,931,606 A | * | 4/1960 | Fraser | H02G 7/053 174/40 R |
| 3,026,368 A | * | 3/1962 | Lindsey | H01B 17/16 174/169 |

(Continued)

FOREIGN PATENT DOCUMENTS

EP    863572 A2    9/1998
WO    2006108445 A1    10/2006

*Primary Examiner* — Dimary Lopez Cruz
(74) *Attorney, Agent, or Firm* — The Watson IP Group, PLC; Jovan N. Jovanovic; Vladan M. Vasiljevic

(57) ABSTRACT

A tangent suspension bracket configured for coupling to at least one of a suspension insulator and a conductor clamp assembly. The tangent suspension bracket further includes a central cap, a first end attachment structure and a second end attachment structure. The central cap structure includes an upper wall having an opening and a depending skirt, together defining a downwardly opening cavity. The opening is structurally configured to allow the passage of a portion of one of the suspension insulator and the conductor clamp assembly while maintaining a portion within the downwardly opening cavity, so as to secure the central cap structure to one of the suspension insulator and the conductor clamp assembly. The first end attachment assembly extends from the central cap and the second end attachment structure extends from the central cap in the opposite direction.

19 Claims, 15 Drawing Sheets

(56) References Cited

U.S. PATENT DOCUMENTS

| | | | | |
|---|---|---|---|---|
| 4,823,022 | A * | 4/1989 | Lindsey | G01R 15/14 |
| | | | | 174/139 |
| 5,073,680 | A * | 12/1991 | Kennedy | H02G 7/02 |
| | | | | 174/169 |
| 6,595,472 | B1 * | 7/2003 | Pisczak | G02B 6/483 |
| | | | | 248/74.1 |
| 7,368,660 | B2 * | 5/2008 | Hardy | H02G 7/053 |
| | | | | 174/40 R |
| 7,794,291 | B2 | 9/2010 | Goch | |
| 8,500,073 | B2 * | 8/2013 | Quesnel | H02G 7/053 |
| | | | | 24/285 |
| 2014/0216808 | A1 * | 8/2014 | Ahlisch | H02G 7/053 |
| | | | | 174/40 CC |

\* cited by examiner

TANGENT SUSPENSION ACCESSORY ASSEMBLY AND ACCESSORY BRACKET THEREFOR

CROSS-REFERENCE TO RELATED APPLICATION

This application claims priority from U.S. Pat. App. Ser. No. 62/234,621 filed Sep. 29, 2015, entitled "Tangent Suspension Accessory Bracket," the entire disclosure of which is hereby incorporated by reference in its entirety.

BACKGROUND OF THE DISCLOSURE

1. Field of the Disclosure

The disclosure relates in general to electrical transmission and distribution line repair devices, and more particularly, to a tangent suspension accessory assembly, and an accessory bracket that forms a part of the tangent suspension accessory assembly.

2. Background Art

As detailed in U.S. Pat. App. Pub. No. 2016/0104954 published to Wolf et al., U.S. Pat. App. Pub. No. 2015/0255888 published to Tamm, and U.S. Pat. No. 7,794,291 issued to Goch, it is known that devices can be utilized to electrically shunt and mechanically support conductors in the field that have been compromised, that have the risk of being compromised prior to replacement, or to extend the life of the transmission or distribution line (or to delay major repairs thereto).

While such repair devices are well known and have been commercially accepted in the marketplace, there are situations wherein additional mechanical safety or support is desired. There is a need to provide additional mechanical support to such repair devices wherein a transmission line extends over, for example, a standard tangent suspension insulator component.

Conductors often deteriorate proximate such tangent suspension insulators due to vibration, weather, corrosion, heat, and other degrading conditions. There are a number of considerations for buttressing or otherwise further providing mechanical support to such a location. For example, it is desirable that such a support remain in the same plane as the conductor so as not to create moments or rotation about the connector in the event of a failure. Such moments or rotations may cause catastrophic damage.

SUMMARY OF THE DISCLOSURE

The disclosure is directed to a tangent suspension bracket configured for coupling to at least one of a suspension insulator and a conductor clamp assembly. The tangent suspension bracket further includes a central cap, a first end attachment structure and a second end attachment structure. The central cap structure includes an upper wall having an opening and a depending skirt, together defining a downwardly opening cavity. The opening is structurally configured to allow the passage of a portion of one of the suspension insulator and the conductor clamp assembly while maintaining a portion within the downwardly opening cavity, so as to secure the central cap structure to one of the suspension insulator and the conductor clamp assembly. The first end attachment assembly extends from the central cap and the second end attachment structure extends from the central cap in the opposite direction.

In some configurations, the tangent suspension bracket further includes a first side attachment structure extending from the central cap and spaced apart from the first end attachment structure and the second end attachment structure, and a second side attachments structure extending from the central cap in a direction opposite from the first side attachment.

In some configuration, the tangent suspension bracket further includes a first tether having a first end coupled to the first end attachment structure, and a second end structurally configured for coupling to the existing conductor on a first side of the suspension insulator.

In some configurations, the tangent suspension bracket further includes a second tether having a first end coupled to the second end attachment structure, and a second end structurally configured for coupling to the existing conductor on a second side of the suspension insulator opposite the first side thereof In some configurations, the central cap includes an inwardly convex surface, with the opening being centrally located thereon.

In some configurations, the central cap is formed from a first bracket member and a second bracket member coupled to the first bracket member.

In some configurations, the first bracket member includes a central cavity, a first side leg extending to one side thereof and a second side leg extending to an opposite side of the first side leg. The second bracket member includes a central cavity, a first side leg extending to one side thereof and a second side leg extending to an opposite side of the first leg. Upon coupling, the central cavity of each of the first bracket member and the second bracket member defines the central cap.

In some configurations, the tangent suspension bracket further comprises a first side spacer positioned between the first side leg of the first bracket member and the first side leg of the second bracket member, and a second side spacer positioned between the second side leg of the first bracket member and the second side leg of the second bracket member.

In some configurations, the tangent suspension bracket further comprises a first side extension leg coupled to the first side spacer and a second side extension leg coupled to the second side spacer. The first tether is sandwiched between the first side extension leg and the first side leg of the first bracket member. The second tether is sandwiched between the second side extension e leg and the second side leg of one of the first bracket member and the second bracket member.

In some configurations, the first tether is sandwiched between the first side extension leg and the first side leg of the first bracket member. The second tether is sandwiched between the second side extension leg and the second side leg of the first bracket member.

In some configurations, the first tether is sandwiched between the first side extension leg and the first side leg of the first bracket member. The second tether is sandwiched between the second side extension leg and the second side leg of the second bracket member.

In some configurations, the first bracket member is coupled to the second bracket member by way of a plurality of fasteners, each of which is extended through the first bracket member and into the second bracket member.

In some configurations, the first bracket member is coupled to the second bracket member by way of a plurality of fasteners, one of which is extended through the first bracket member and into the second bracket member, and the other of which is extended through the second bracket member and into the first bracket member.

In some configurations, the first bracket member and the second bracket member are substantially identical.

In some configurations, the tangent suspension bracket further comprises a secondary bracket assembly configured to retain a jumper conductor below the existing conductor.

In some configurations, the tangent suspension bracket further comprises a first side attachment structure extending from the central cap and spaced apart from the first end attachment structure and the second end attachment structure, and a second side attachments structure extending from the central cap in a direction opposite from the first side attachment. The secondary bracket further comprises a hanger assembly coupled to each of the first and second side attachments and a clamp assembly coupled to a lower end of the hanger assembly. The clamp assembly includes a u-shaped bracket structurally configured to receive the jumper conductor therealong.

In some configurations, the hanger assembly comprises a first side leg coupled at an upper end to the first side attachment structure and coupled to the clamp assembly at the lower end thereof, and a second side leg coupled at an upper end to the second side attachment structure and coupled to the clamp assembly at the lower end thereof.

In some configurations, the existing conductor extends between the first side leg and the second side leg, and between the central cap and the clamp assembly of the secondary bracket assembly.

In some configurations, the hanger assembly is pivotally coupled to the first side attachment and to the second side attachment and pivotably coupled to the clamp assembly.

BRIEF DESCRIPTION OF THE DRAWINGS

The disclosure will now be described with reference to the drawings wherein.

DETAILED DESCRIPTION OF THE DISCLOSURE

Figure 1:
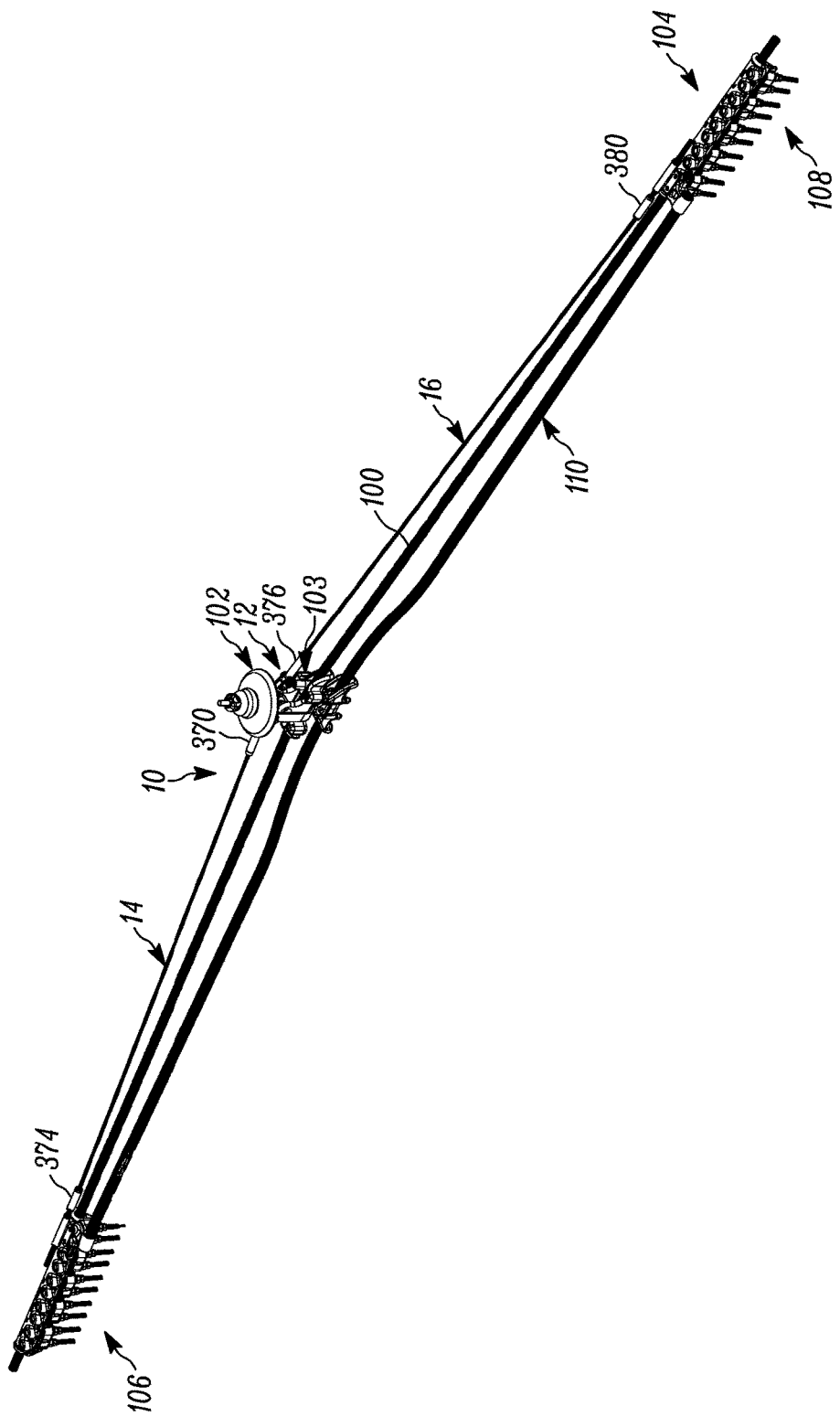
FIG. 1 of the drawings is a perspective view of a tangent suspension accessory assembly in operative position coupled to an existing conductor, suspension insulator and conductor clamp assembly, as well as, an existing repair device.

While this disclosure is susceptible of embodiment in many different forms, there is shown in the drawings and described herein in detail a specific embodiment(s) with the understanding that the present disclosure is to be considered as an exemplification and is not intended to be limited to the embodiment(s) illustrated.

It will be understood that like or analogous elements and/or components, referred to herein, may be identified throughout the drawings by like reference characters. In addition, it will be understood that the drawings are merely schematic representations of the invention, and some of the components may have been distorted from actual scale for purposes of pictorial clarity.

Referring now to the drawings and in particular to FIG. 1, the tangent suspension accessory assembly is shown generally at 10. The tangent suspension accessory assembly is structurally configured for the coupling of accessories, such as a safety tether across a tangent suspension (such as across an insulator support ball and socket joint). Such a configuration can provide additional mechanical integrity to a conductor at a tangent suspension bracket. Such a configuration can greatly extend the useable life of the existing conductor and support infrastructure.

Figure 2:
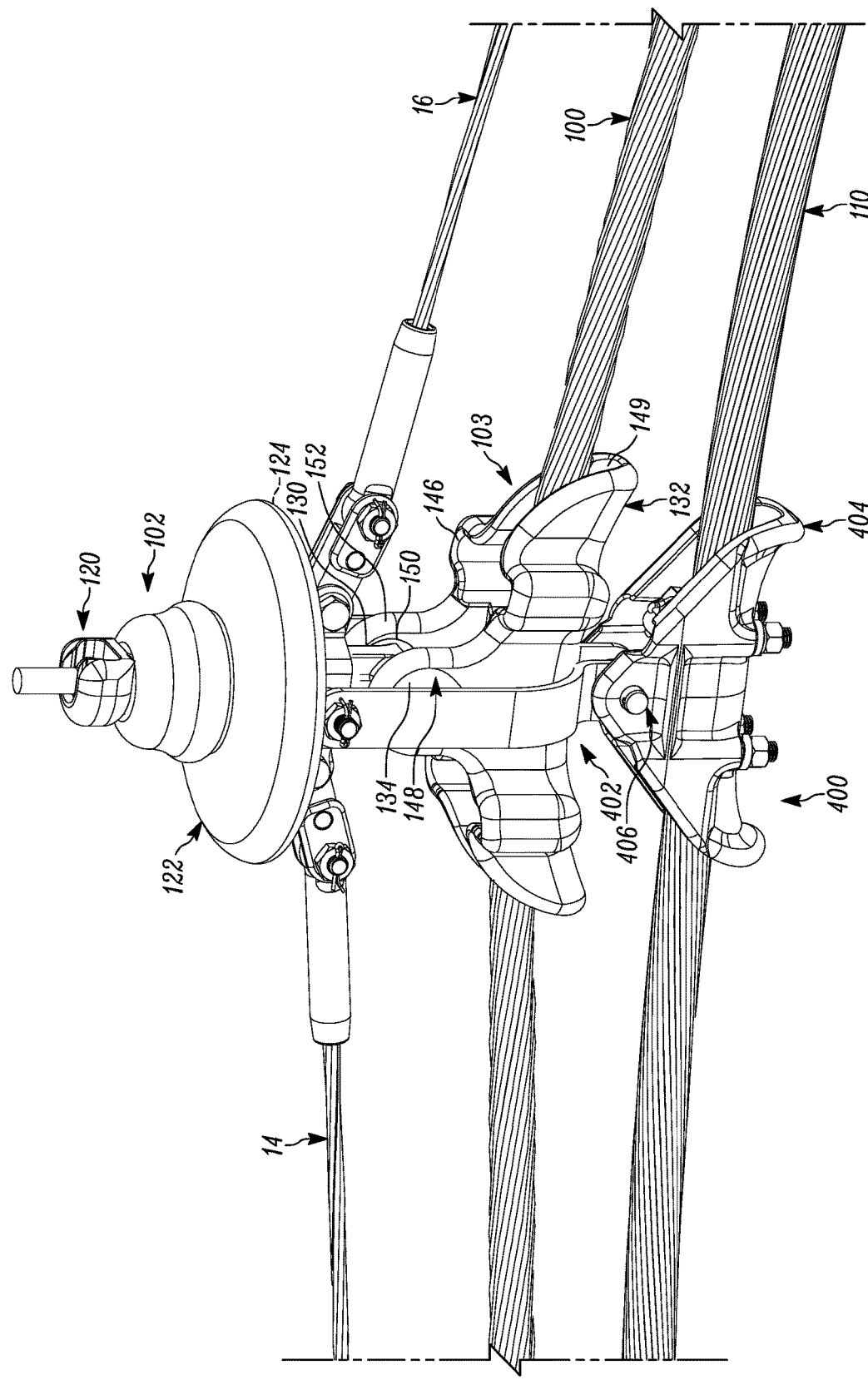
FIG. 2 of the drawings is a partial perspective view of the tangent suspension accessory assembly in operative position coupled to an existing conductor, suspension insulator and conductor clamp assembly, as well as, an existing repair device.
Figure 3:
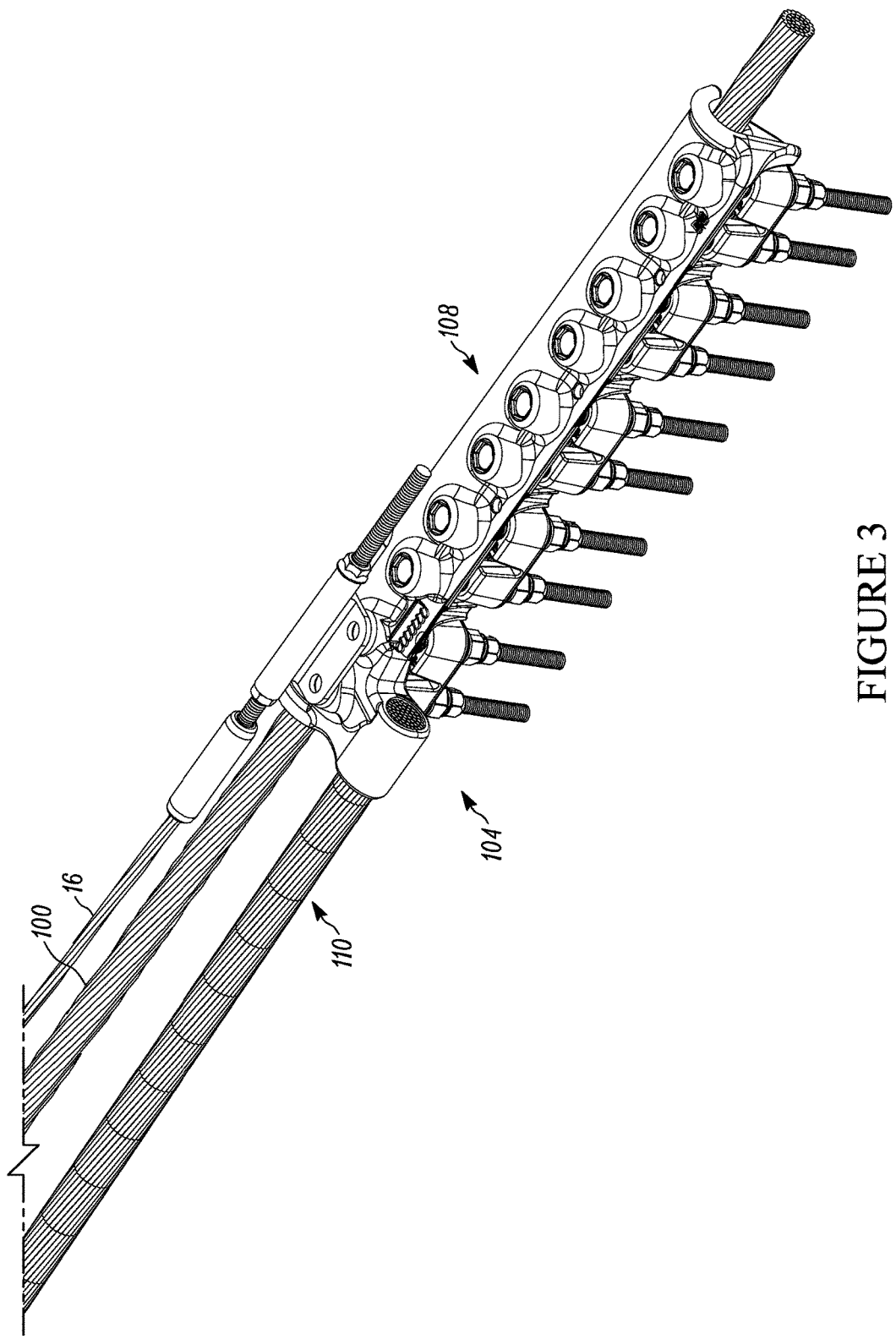
FIG. 3 of the drawings is a partial perspective view of the tangent suspension accessory assembly in operative position coupled to an existing conductor, suspension insulator and conductor clamp assembly, as well as, an existing repair device.

With reference to FIGS. 1 through 3, collectively, the existing structure includes existing conductor 100 (which preferably comprises an aluminum stranded conductive cladding about a core that may be formed from steel strands or composite materials), suspension insulator 102 and conductor clamp assembly 103. Typically, the conductor is held by the conductor clamp assembly 103 which is suspended from a tower, pole, or other structure by the suspension insulator 102. In the configuration shown, the suspension insulator comprises an upper coupling 120, a cap member 122 (which is generally a polymer, ceramic or other insulator) and a lower coupling. The lower coupling generally comprises a pin that extends from the cap member, along with a ball positioned at the distal end of the pin and spaced apart from the cap member. It will be understood that depending on the voltage that is carried by the existing conductor, a number of suspension insulators may be strung end to end to increase the distance from other components (such as the tower structure) to preclude arcing or the like. It will be understood that the lower coupling 124 is electrically isolated from the upper coupling 120.

Figure 4:
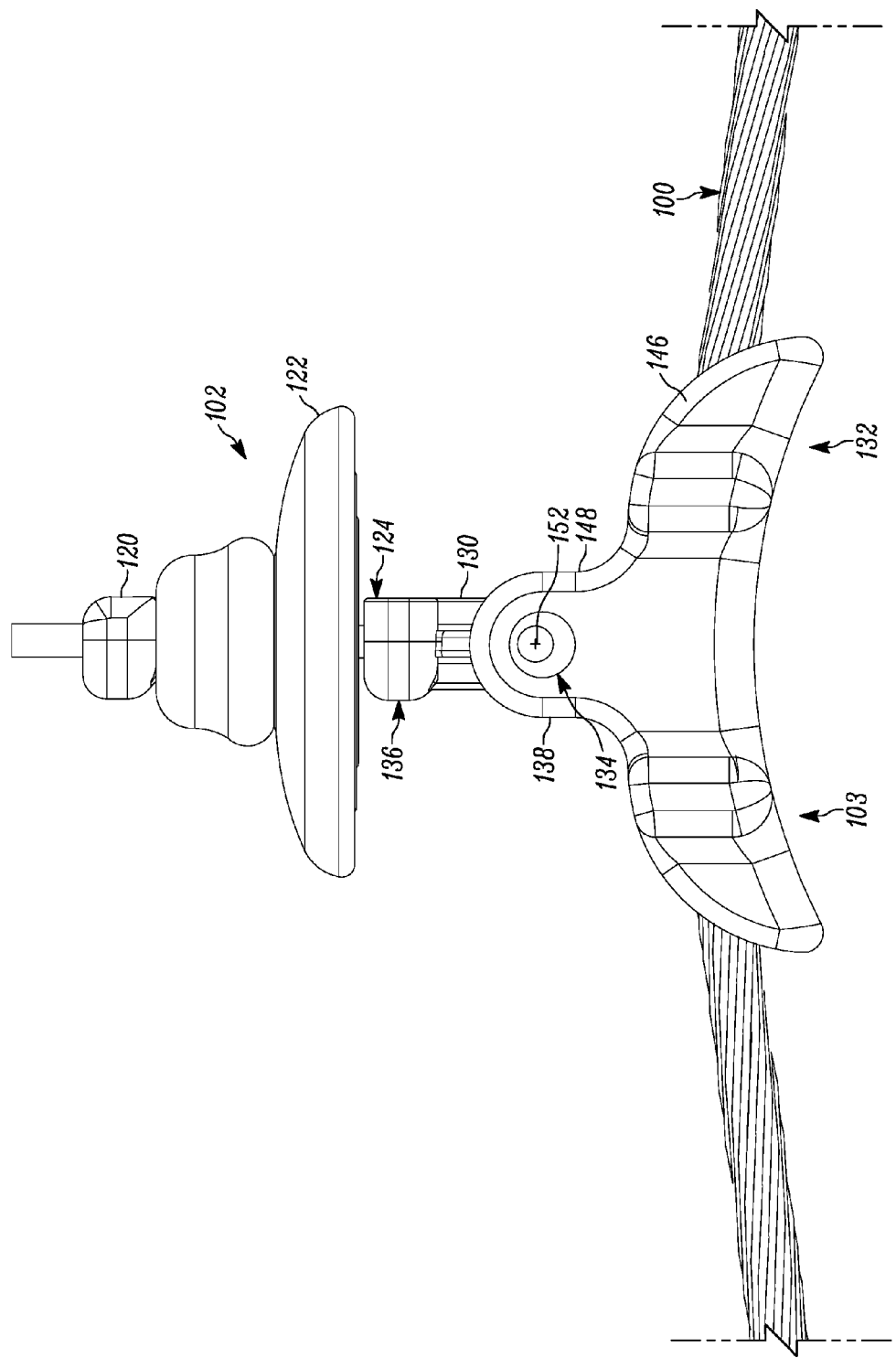
FIG. 4 of the drawings is side elevational view of an existing conductor, suspension insulator and conductor clamp assembly.
Figure 5:
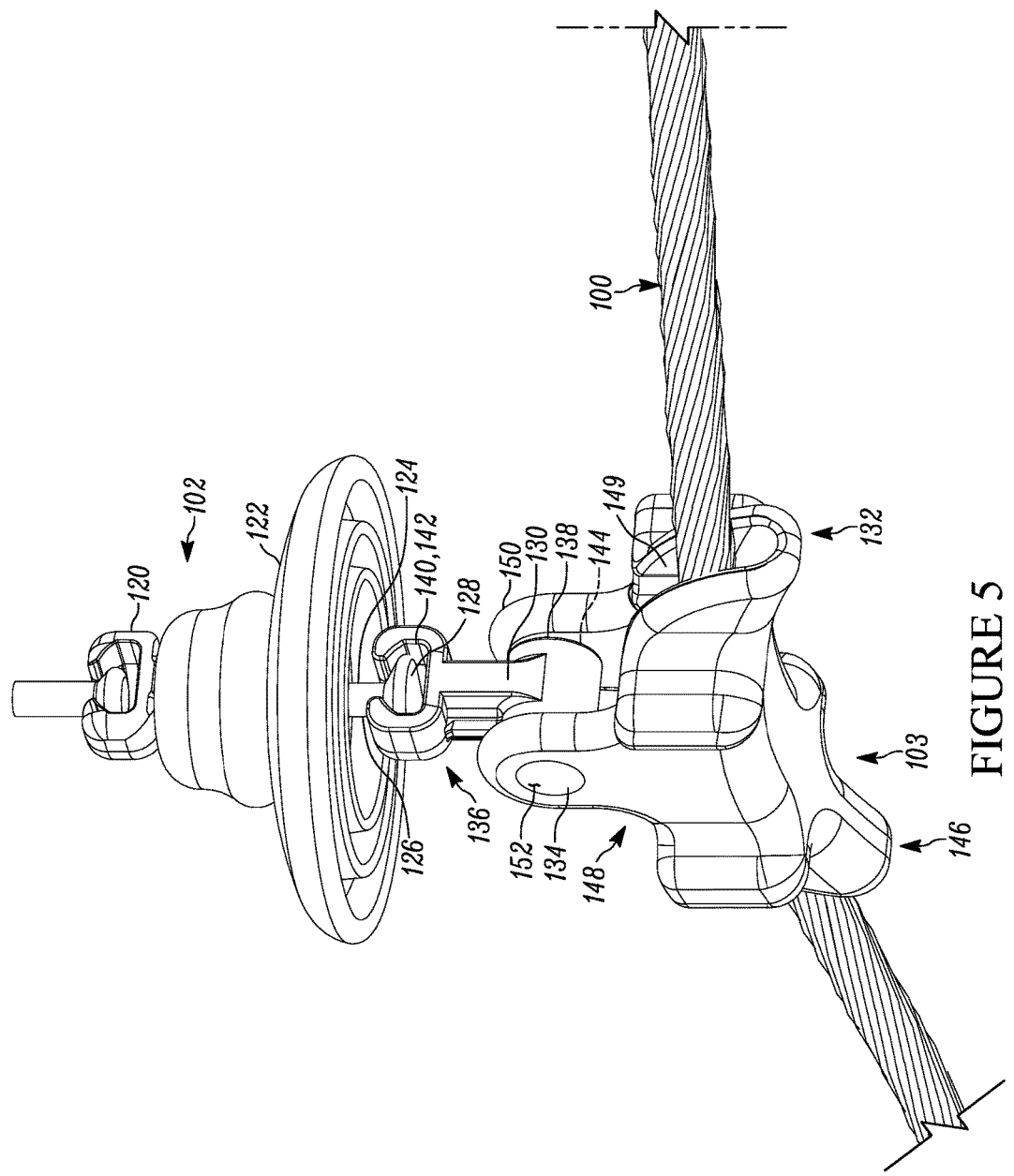
FIG. 5 of the drawings is a perspective view of an existing conductor, suspension insulator and conductor clamp assembly.

With reference to FIGS. 4 and 5, The conductor clamp assembly 103, in the configuration shown, comprises socket fitting 130, lower clamp body 132 and joining pin 134. The socket fitting 130 includes upper end 136 and lower end 138. The upper end 136 includes socket 140 which includes side opening 142. The lower end includes pivot opening 144. The socket 140 allows for the passage of the ball and pin of the lower coupling 124 in from the side through the side opening 142. However, once inserted, the two structures cannot be separated through the pulling apart of the structures. That is, the ball of the suspension insulator is too large to extend through the upper portion of the opening of the socket fitting.

The lower clamp body 132 includes a generally u-shaped body 146 defining a channel 149 therealong. The lower clamp body 132 includes a first side upper flange 148 and a second side upper flange 150 spaced apart therefrom. Each flange includes corresponding openings which cooperatively form a pivot opening 152. The lower end 138 of the socket fitting 130 is positioned between the first side upper flange 148 and the second side upper flange 150 so as to align the opening 144 with the pivot opening 152. The joining pin 134 is extended through the opening 144 and the pivot opening 152 to secure the structures together, while allowing relative pivoting therebetween.

Referring again to FIG. 1, the repair device 104 is shown as comprising first clamp 106, second clamp 108 and jumper conductor 110. The first clamp 106 is coupled to the existing conductor on one side of the conductor clamp assembly 103. The second clamp 108 is positioned on the other side of the conductor clamp assembly 103. The jumper conductor 110 extends therebetween so as to provide a shunt to the electrical current between the first and second clamps, and also to provide mechanical support between the connectors. A number of different repair devices are contemplated, including but not limited to the repair devices that are disclosed and claimed in U.S. Pat. App. Pub. No. 2016/0104954 published to Wolf et al., U.S. Pat. App. Pub. No. 2015/0255888 published to Tamm, and U.S. Pat. No. 7,794,291 issued to Goch, the entire specification of each of which is hereby incorporated by reference herein. Of course, other configurations, or repair devices or clamps or other accessories are likewise suitable of use with the tangent suspension accessory assembly.

Figure 6:
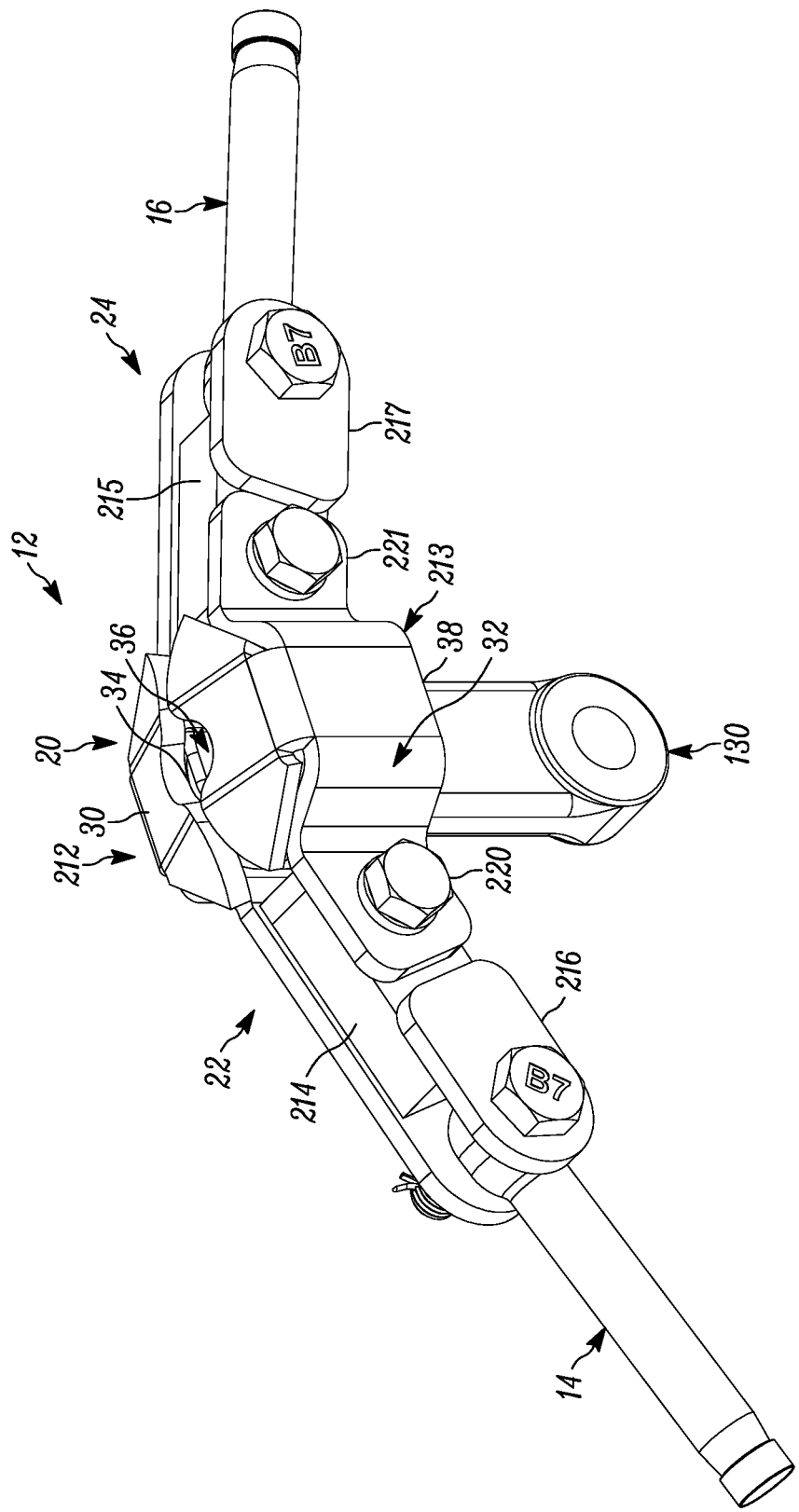
FIG. 6 of the drawings is a perspective view of the tangent suspension bracket of the tangent suspension accessory assembly, showing, in particular, the position relative to a socket fitting and relative to opposing tether portions.
Figure 7:
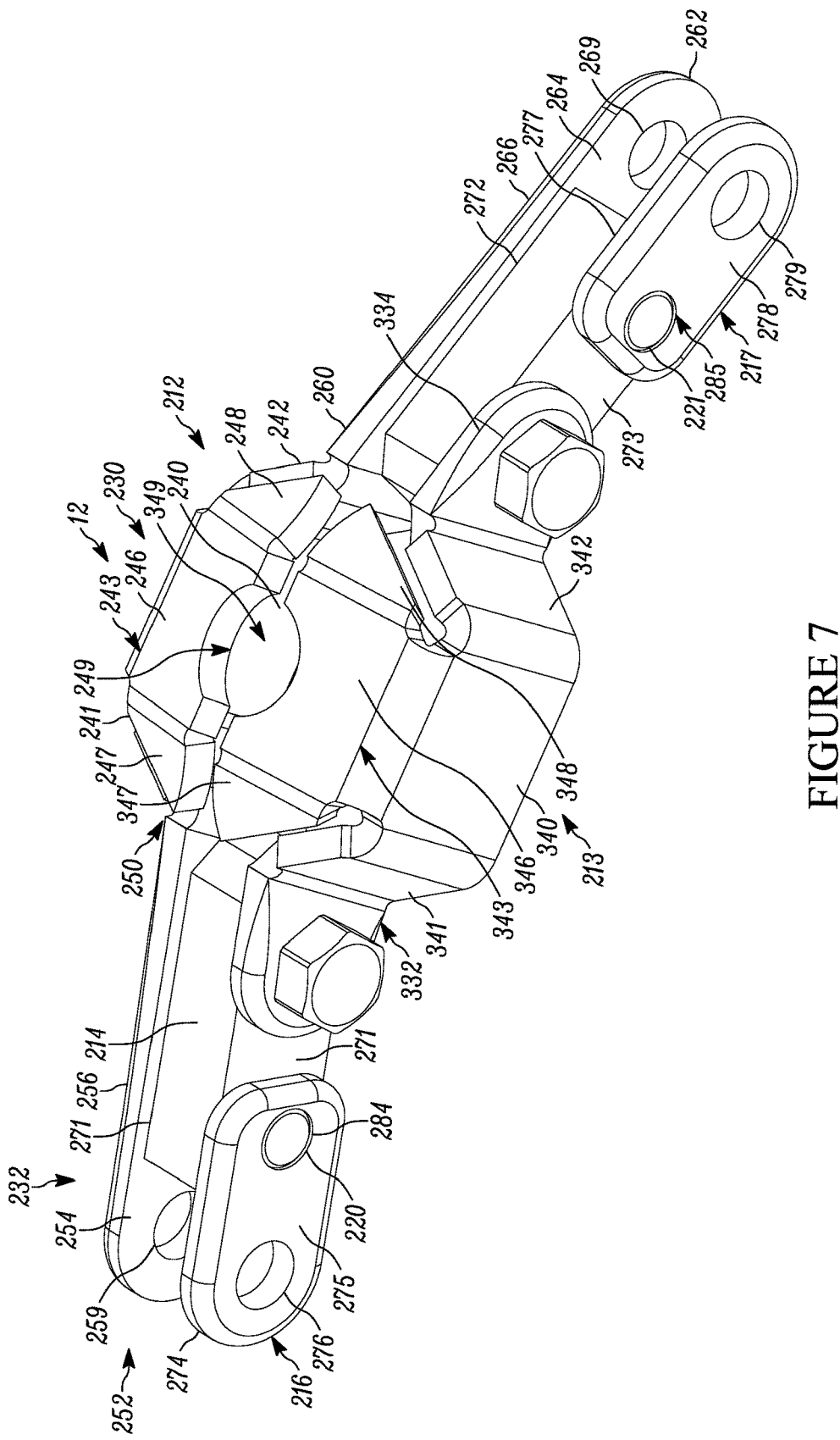
FIG. 7 of the drawings is a perspective view of the tangent suspension bracket of the tangent suspension accessory assembly, showing, in particular the first and second bracket members, the spacers and the extension legs.

The tangent suspension accessory bracket, as is shown in greater detail in FIGS. 6 through 11, and in particular in FIG. 6 thereof, comprises a central cap structure 20, first end attachment structure 22, second end attachment structure 24, first side attachment structure 26 and second side attachment structure 28. The central cap structure includes an upper wall 30 and a depending skirt 32. The upper wall 30 includes a central opening 34, and is preferably inwardly concave so as to provide a dome like structure internal thereto. The depending skirt 32 preferably encircles the upper wall 30. The upper wall 30 and the depending skirt 32 define a downwardly opening cavity 36. In the configuration shown, the upper wall 30 defines a hexagonal configuration and the depending skirt 32 has a six-sided configuration. Of course, other configurations, such as having more sides or being at least partially arcuate if not entirely arcuate (i.e., circular, oval, elliptical, etc.) is likewise contemplated. In still other configurations, the shape of the depending skirt can be varied and non-uniform. It will be understood that generally the opening 34 is substantially centrally positioned, and the opening 34 is smaller than the lower opening of the cavity that is formed by the depending skirt at a lower end 38 thereof.

The first end attachment structure 22 is positioned opposite the second end attachment structure 24. Preferably the first end attachment structure 22, the opening 34 and the second end attachment structure 24 lie along the same axis, which axis, preferably bisects the central cap 20. As will be explained below, the first tether 14 is coupled to the first end attachment structure, with the second tether 16 being coupled to the second end attachment structure. In the configuration contemplated, the first and second tethers, and, as such, the attachment structure 22 and the attachment structure 24 lie along the same axis, so as to overlie each other. The tethers are connected to the existing conductor (often indirectly, through a bracket, such as a clamp of a repair device.

It will be understood that the central cap is configured to extend between structures of an suspension insulator or of a conductor clamp assembly, such as a socket fitting so that a narrower portion extends through the opening 34 while a larger portion is captured within the downwardly opening cavity. As such, the force on the tangent suspension bracket is straight down, so that a load is in tension over the suspension insulator (and not causing of rotational moments thereabout).

A number of structures are contemplated for the tangent suspension accessory bracket. While not limited thereto, the different structures include a first bracket member 212 and a second bracket member 213. The first and second bracket members are attached together at opposing ends. In some configurations, the first end and second end attachment structures include the structure coupling the two brackets together, in other configurations, the brackets are coupled directly together, and additional structures form the first and second end attachment structures and the first and second side attachment structures. In some configurations, the first and second side attachment structures can be omitted. Various configurations are shown in FIGS. 6 through 15, and will be described below.

For example, and with reference to FIGS. 6 through 11, one configuration of the tangent suspension accessory bracket is shown. The bracket includes a first bracket member 212 and a second bracket member 213. The first bracket member includes central cavity 230, first side leg 232 and second side leg 234, first side spacer 214, second side spacer 215, first side extension leg 216, second side extension leg 217, and first and second side pins 220, 221. The central cavity 230 includes back wall 240, first outward wall 241, second outward wall 242 and top wall 243. The back wall, first outward wall and the second outward wall form a portion of the depending skirt of the central cap.

The top wall includes central portion 246, first wing portion 247, second wing portion 248 and slot 249. The top wall forms a portion of the upper wall of the central cap. The slot 249 cooperates with the slot 349 to collectively define the opening 34 of the central cap 20.

The first side leg 232 includes proximal end 250, distal end 252, inner side 254, outer side 256, and a plurality of openings, namely, proximate opening 258, central opening 257 and distal opening 259. The second side leg includes proximal end 260, distal end 262, inner side 264, outer side 266, and a plurality of openings, namely, proximate opening 268, central opening 267 and distal opening 259.

In the configuration shown, each of the central cavity, the first side leg and the second side leg are formed from a single piece of flat stock that is bent at particular regions so as to form the different structures.

The first side spacer 214 is coupled to the inner side 254 of the first side leg 232 between the proximal and distal ends thereof. The first side spacer includes first face 270 and second face 271, with the first face preferably welded about the perimeter so as to preclude the gathering of moisture between the first side spacer and the inner side of the first side leg. The first side spacer includes inner opening 280 and outer opening 281. The inner opening corresponds to the proximal opening 258 of the first side leg 232. The outer opening corresponds to the central opening 257.

The second side spacer 215 is coupled to the inner side 264 of the second side leg 234 between the proximal and distal ends thereof. The second side spacer includes first face 272 and second face 273, with the first face preferably welded about the perimeter so as to preclude the gathering of moisture between the second side spacer and the inner side of the second side leg. The second side spacer includes inner opening 282 and outer opening 283. The inner opening corresponds to the proximal opening 268 of the second side leg 234. The outer opening corresponds to the central opening 267.

The first side extension leg 216 includes inner side 274, outer side 275, inner opening 284 and outer opening 276. The first side extension leg is welded to the first side spacer 214, with the inner opening 284 corresponding to the outer opening of the first spacer member. The outer opening 276 corresponds to the distal opening 259 of the first side leg 232.

The second side extension leg 217 includes inner side 277, outer side 278, inner opening 285 and outer opening 279. The second side extension leg is welded to the second side spacer 215, with the inner opening 285 corresponding to the outer opening of the second spacer member. The outer opening 279 corresponds to the distal opening 269 of the second side leg 234.

The first side pin 220 extends through the inner opening 284 of the first side extension leg, the outer opening 281 of the first side spacer and the central opening 257 of the first side leg 232. The second side pin 221 extends through the inner opening 285 of the second side extension leg, the outer opening 283 of the second side spacer and the central opening 267 of the second side leg 234. The first and second side pins provide the additional strength in tension to enhance the strength of the coupling of the side legs with the spacers and the extension legs.

The second bracket member 213 comprises central cavity 330, first side leg 332 and second side leg 224. The central cavity 330 includes back wall 340, first outward wall 341, second outward wall 342 and top wall 343. The back wall, the first outward wall and the second outward wall together form a portion of the depending skirt, and together with the similar structure of the first bracket member form the depending skirt.

The top wall 343 includes central portion 346, first wing portion 347, second wing portion 348 and slot 349. The top wall forms a portion of the upper wall of the central cap structure. Additionally, the slot 349, as noted above, together with the slot 249 cooperatively define the opening 34 of the central cap 20.

The first side leg 332 includes proximal end 350, distal end 352, inner side 354, outer side 356 and opening 358. The first side leg is configured to matingly overlie the first side leg 232 so as to sandwich the first side spacer 214 therebetween. The openings 258, 280 and 358 substantially correspond, and fastener 292 can be extended and fastened thereto. It is contemplated that at least one of the proximal opening 258 and the inner opening 280 are threaded so as to matingly thread with the threads of first fastener 292.

The second side leg 334 includes proximal end 360, distal end 362, inner side 364, outer side 366 and opening 368. The second side leg is configured to matingly overlie the second side leg 234 so as to sandwich the second side spacer 215 therebetween. The openings 268, 282 and 368 substantially correspond, and fastener 294 can be extended and fastened thereto. It is contemplated that at least one of the proximal opening 268 and the inner opening 282 are threaded so as to matingly thread with the threads of the second fastener 294.

When joined together, the central cavities of the bracket members form the central cap structure, with the first side legs, the first side extension leg and the first side spacer forming the first end attachment structure 22 and the second side legs, the second side extension leg and the second side spacer forming the second end attachment structure 24.

Figure 8:
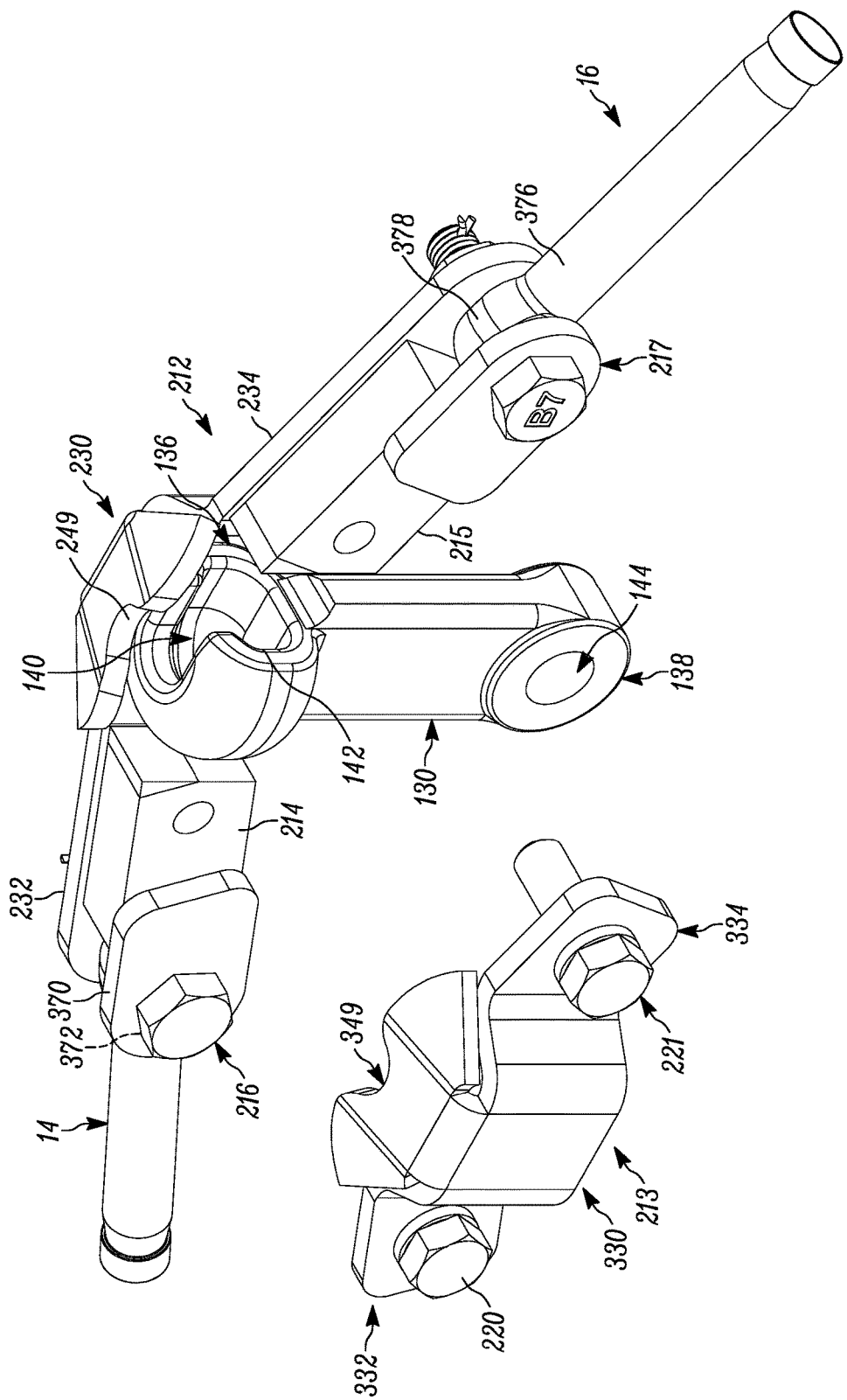
FIG. 8 of the drawings is an exploded perspective view of the tangent suspension bracket of the tangent suspension accessory assembly, showing, in particular the first and second bracket members, the spacers and the extension legs, with the socket fitting in position and the second bracket member spaced apart from the first bracket member.
Figure 9:
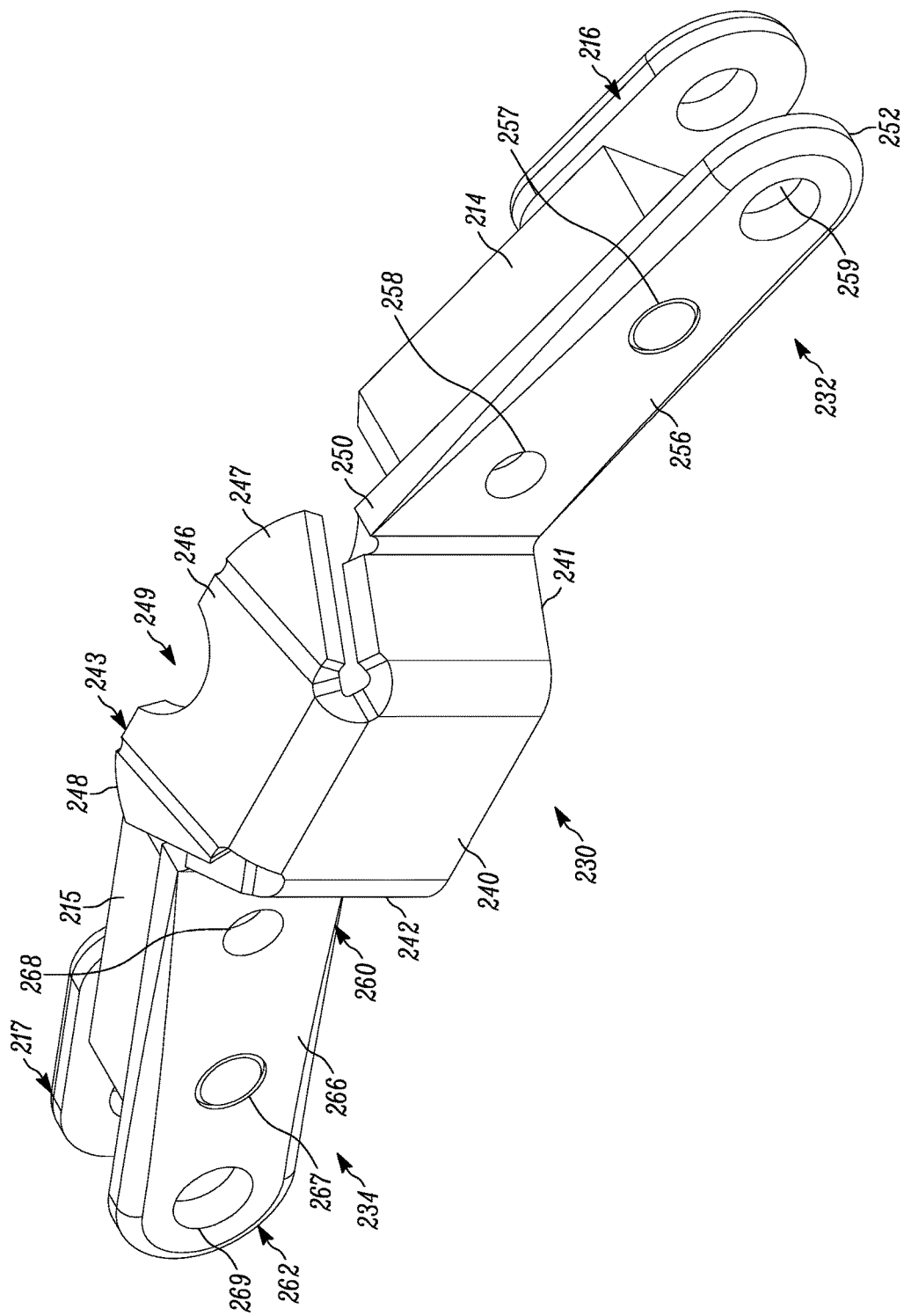
FIG. 9 of the drawings is a front perspective view of the first bracket member with the spacers and the extension legs coupled thereto.
Figure 10:
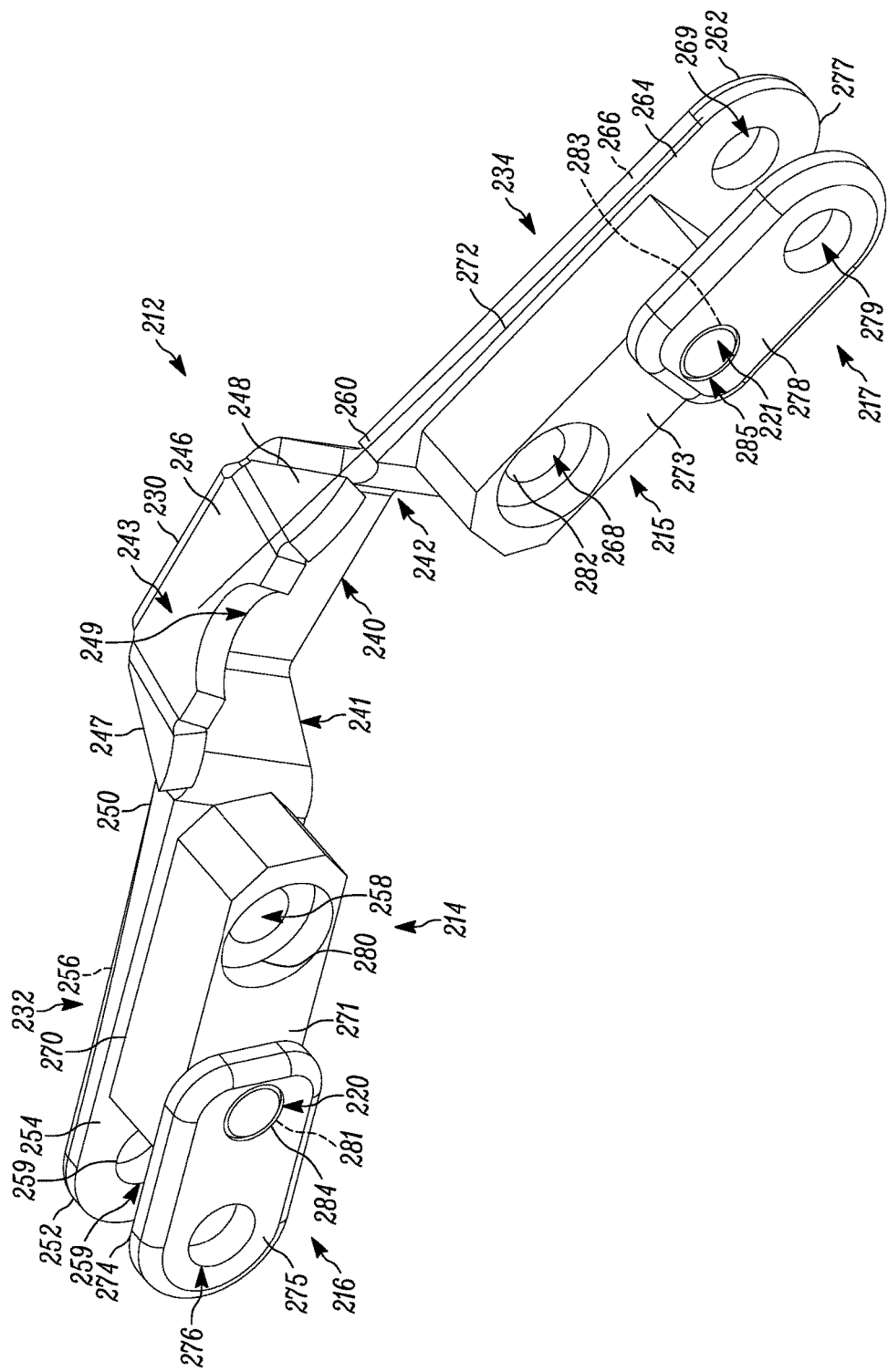
FIG. 10 of the drawings is a back perspective view of the first bracket member with the spacers and extension legs coupled thereto.
Figure 11:
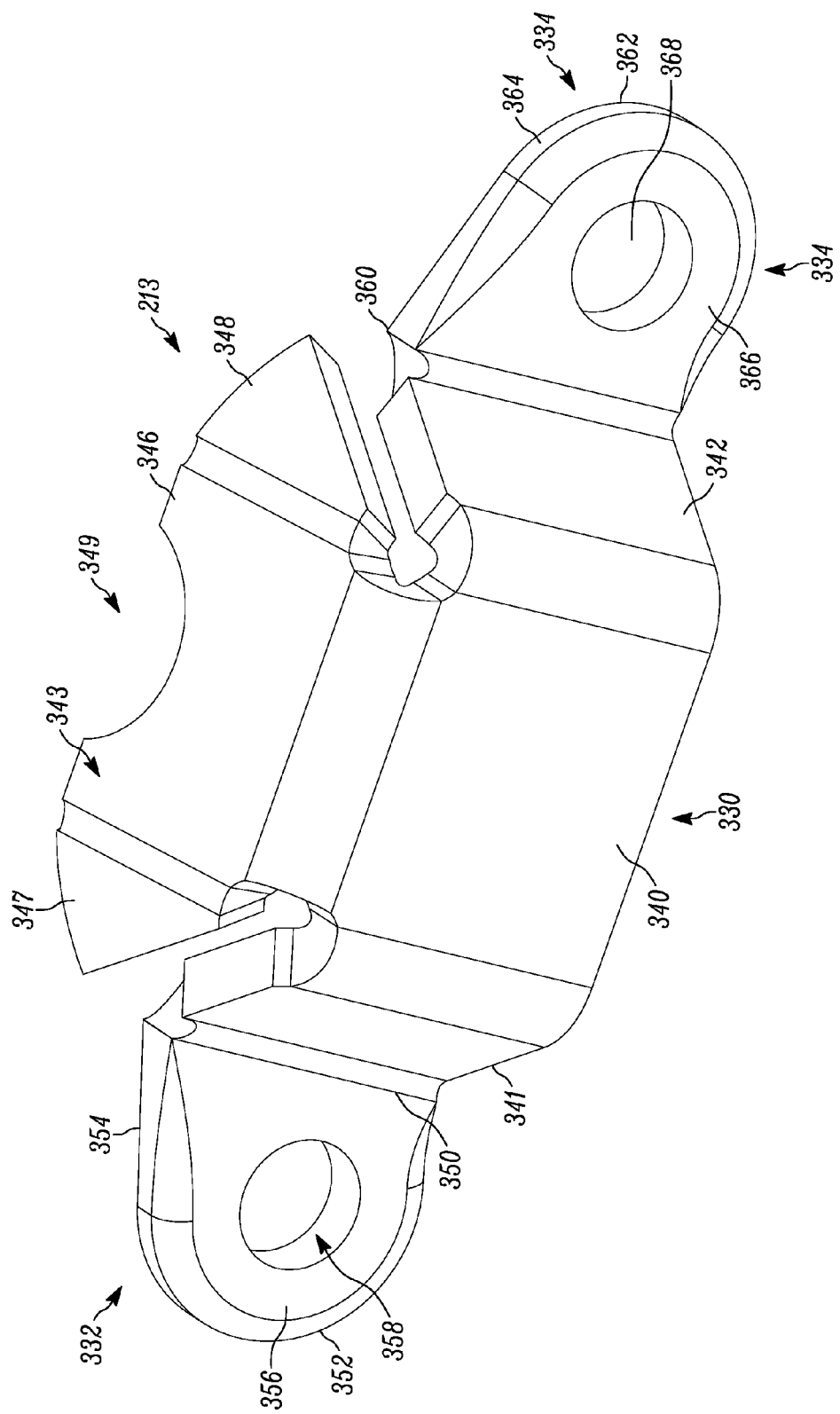
FIG. 11 of the drawings is a front perspective view of the second bracket member.

In the configuration shown in FIG. 1 and FIG. 8, collectively, the first tether 14 includes first end 370 and second end 374. The first end includes opening 372. The first end 370 is positioned between the first side leg and the first side extension leg so that the distal opening 259 and the outer opening 276 align with the opening 372 of the first tether. Pin 382 is extended therethrough and may be limited in movement through a cotter pin or the like. The second end 374 of the first tether is coupled to the first clamp 106 of the repair device 104.

Similarly, the second tether 16 includes first end 376 and second end 380. The first end includes opening 378. The first end 376 is positioned between the second side leg and the second side extension leg so that the distal opening 269 and the outer opening 279 align with the opening 378 of the second tether. Pin 384 is extended therethrough and may be limited in movement through a cotter pin or the like. The second end 380 of the second tether is coupled to the second clamp 108 of the repair device 104. Advantageously, the tether assembly is in line with the existing conductor, and the suspension insulation. As such, in the event of a failure the tether is in tension without creating a moment around the suspension insulation, which can have catastrophic results.

Figure 12:
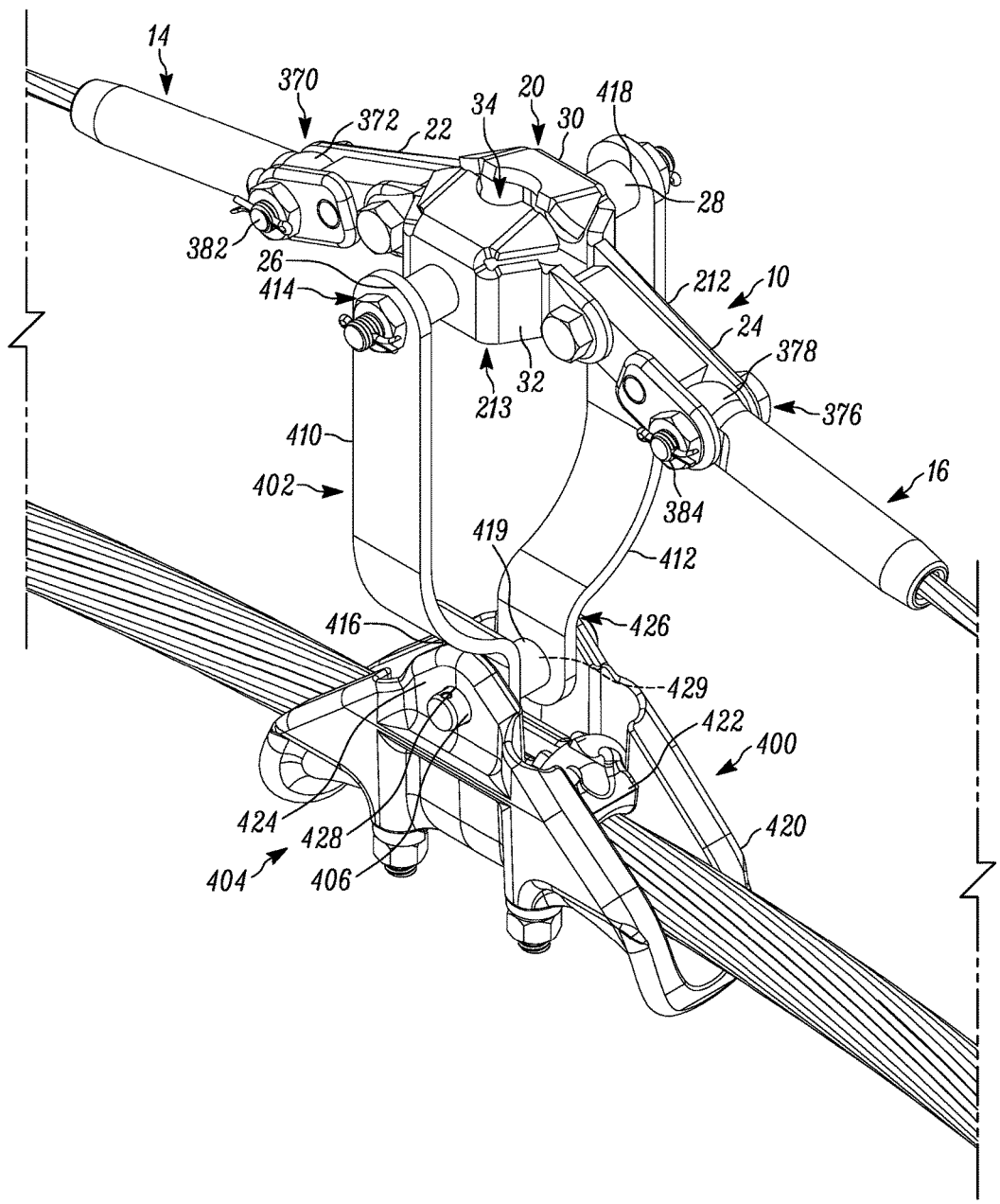
FIG. 12 of the drawings is a perspective view of the tangent suspension accessory assembly, showing, in particular, the tangent suspension bracket and the secondary bracket assembly.
Figure 13:
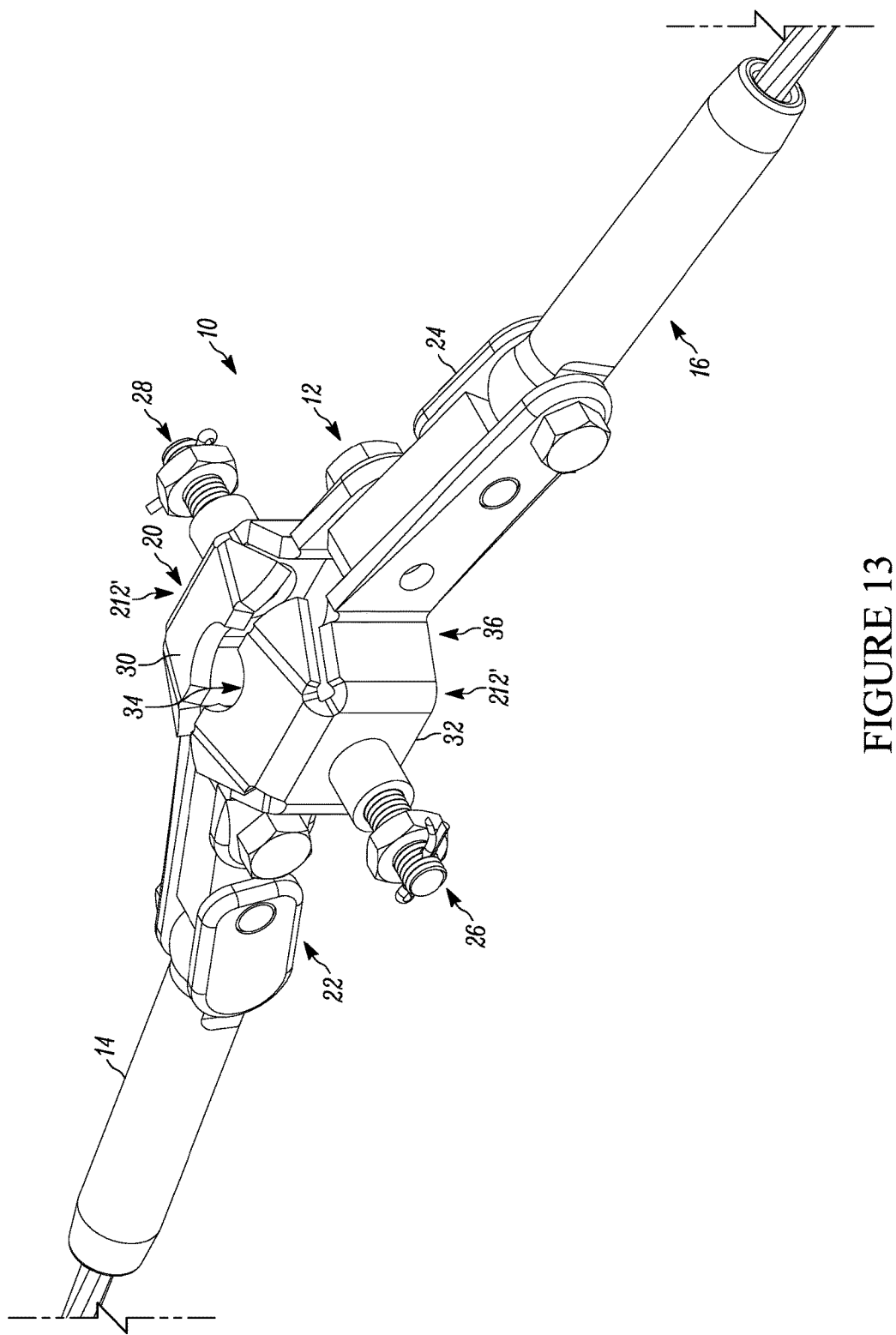
FIG. 13 of the drawings is a perspective view of another configuration of the tangent suspension bracket of the present disclosure, wherein the first and second bracket members have an alternate configuration.
Figure 14:
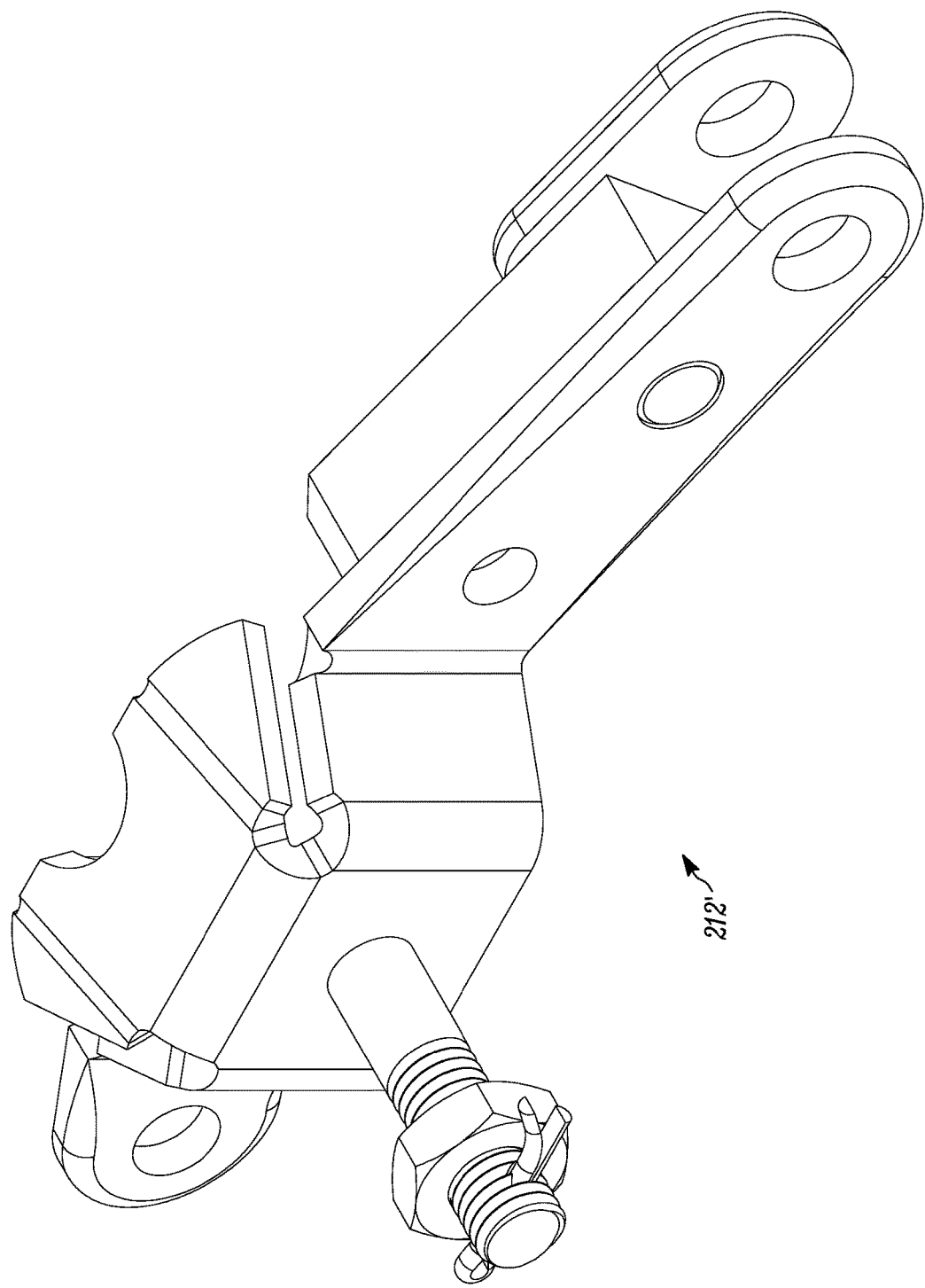
FIG. 14 of the drawings is a perspective view of a bracket member of the configuration shown in FIG. 13, with a spacer and an extension leg coupled thereto.

In some configurations, such as the configuration shown in FIGS. 1 and 2, and in FIG. 12 in greater detail, a secondary bracket assembly 400 may be utilized. The secondary bracket assembly 400 is coupled to the tangent suspension bracket 12 about the first side attachment 26 and the second side attachment 28. In the configuration shown, the first side attachment 26 comprises a fastener that extends through an opening in (or that may be coupled directly to) the back wall 240 of the central cavity 230 of the first bracket member. The second side attachment 28 comprises a fastener that extends through an opening in (or that may be coupled directly to) the back wall 340 of the central cavity 330 of the second bracket member.

The secondary bracket assembly 400 includes hanger assembly 402, clamp assembly 404 and pin member 406. The hanger assembly 403 includes first side leg 410 and second side leg 412. The first side leg includes upper opening 414 and lower opening 416. The upper opening is coupled to the first side attachment 26, by extending the same through the upper opening 414. The second leg includes upper opening 418 and lower opening 419. The upper opening is coupled to the second side attachment 28, by extending the same through the upper opening 418.

The clamp assembly 404 includes u-shaped bracket 420 and clamp member 422. The u-shaped bracket 420 includes first upper wing 424 and second upper wing 426. A pair of openings 428, 429 extend through the upper wings, respectively. The clamp member is configured to be coupled to the u-shaped bracket so as to sandwich a conductor therebetween. Fasteners can be used to tighten the configuration.

The first and second side legs are positioned between the first upper wing and the second upper wing of the u-shaped bracket so that the openings 416, 419 and 428, 429 align. Once aligned, the pin member 406 is extended therethrough. It will be understood that in certain configurations, the side legs and the u-shaped bracket are permitted to pivot relative to each other by way of pin member 406. In other configurations, the first and second leg members are configured to be pivotably coupled to the first side attachment 26 and the second side attachment 28.

In such a configuration, the jumper conductor 110 of the repair device 104 can be supported by the secondary bracket assembly by placing the same within the u-shaped bracket 420 wherein the jumper conductor can be clamped thereto by the clamp member 422. It will be understood that in other configurations, the secondary bracket assembly may be omitted. In such a configuration, the tangent suspension bracket may include first and second side attachment structures, or such structures may be omitted.

Advantageously, in the configuration shown, the tangent suspension bracket can be easily assembled by a user, as the fasteners 292, 294 are located on the same side of the bracket. As such, when the user is elevated working on an energized line (for example, in a bucket or the like), the user can remain on one side and not have to reach to opposing sides of the bracket or on opposing sides of an energized line.

In other configurations, however, it is contemplated that attachment may occur on opposing sides. For example, in the configuration shown in FIGS. 13 and 14, the tangent suspension bracket can be formed from a configuration wherein the first bracket member and the second bracket member comprise the same configuration, and they are coupled to each other to form a resulting configuration that is similar to the configuration shown in the configuration above. Specifically, in this configuration, the first bracket member 212' has a first side leg that is configured like the first side leg of the first side bracket above. On the other hand, the second side leg is configured to be similar to the second side leg of the second bracket member above. When two of the same types of brackets are coupled together, one bracket member defines the first side spacer and the first side extension leg. Similarly, the other bracket member defines the second side spacer and the second side extension leg. Advantageously, fewer distinct parts are required. The use can merely grasp any two bracket members to form the overall suspension bracket.

It will further be understood that in either configuration, while the bracket members are shown as being formed through a stamping operation on a flat stock, it is contemplated that other constructions are contemplated, such as forged, cast or machined structures. It is further contemplated that such structures may be formed from a number of different materials, most preferably a steel material, while other materials, such as other metals, alloys and composites are contemplated for use.

Figure 15:
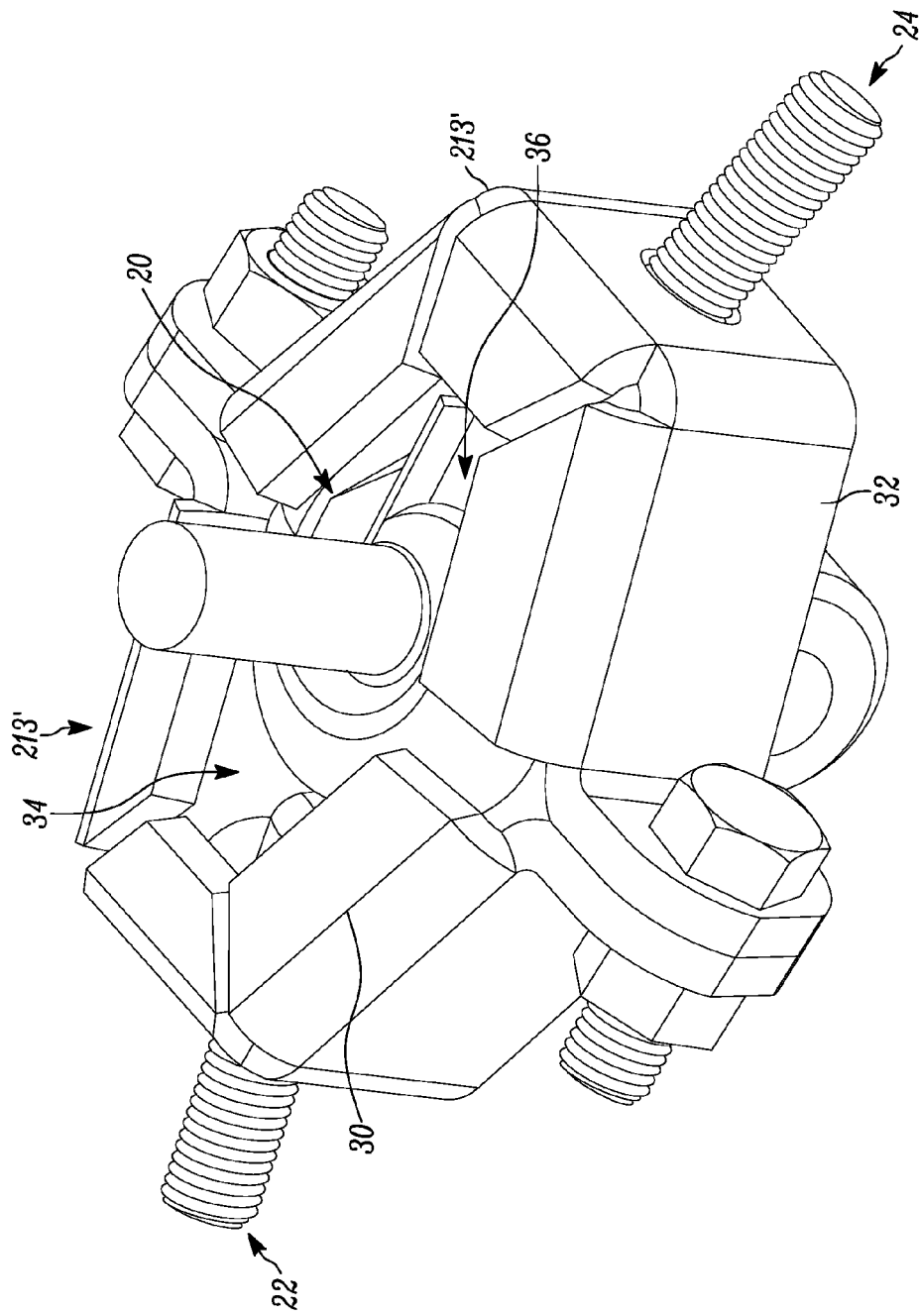
FIG. 15 of the drawings is a perspective view of another configuration of the tangent suspension bracket of the present disclosure, wherein the first and second bracket members have an alternate configuration, and also showing a portion of the suspension insulator and the socket fitting.

In still another configuration, as is shown in FIG. 15, a pair of second bracket members, such as second bracket member 213', and the bracket members are coupled together with fasteners 292, 294. A nut can be utilized with the fasteners, if, for example, the openings of the bracket members are not threaded. In other configurations, they may be threaded. The back wall 340 of each of the second bracket members 213 include first and second end attachment structures that extend from the respective back walls 340 and have a structure that is much like the first and second side attachment structures identified above with respect to the embodiment of FIG. 2.

Of course other configurations are likewise contemplated for use. That is, brackets that can likewise form the central cap so as to encircle a suspension insulator component for the attachment of accessories, while minimizing or eliminating disturbance of the existing conductor which may be energized.

The foregoing description merely explains and illustrates the disclosure and the disclosure is not limited thereto except insofar as the appended claims are so limited, as those skilled in the art who have the disclosure before them will be able to make modifications without departing from the scope of the disclosure.

What is claimed is:

1. A tangent suspension bracket configured for coupling to at least one of a suspension insulator and a conductor clamp assembly, the tangent suspension bracket further comprising:
   a central cap structure including:
      an upper wall having an opening; and
      a depending skirt, depending from the upper wall, the upper wall and the depending skirt defining a downwardly opening cavity, with the depending skirt encircling the opening cavity and the upper wall spanning across the depending skirt, the opening providing ingress into the cavity spaced apart from the depending skirt, the depending skirt having a lower edge opposite the upper wall that defines a lower opening that is larger than the opening of the upper wall;
   wherein the opening is structurally configured to allow the passage of a portion of one of the suspension insulator and the conductor clamp assembly while maintaining a second portion within the downwardly opening cavity, so as to secure the central cap structure to one of the suspension insulator and the conductor clamp assembly;
   a first end attachment structure extending from the central cap; and
   a second end attachment structure extending from the central cap in a direction opposite from the first end attachment.

2. The tangent suspension bracket of claim 1 further comprising a first side attachment structure extending from the central cap and spaced apart from the first end attachment structure and the second end attachment structure, and a second side attachments structure extending from the central cap in a direction opposite from the first side attachment.

3. The tangent suspension bracket of claim 1 further including a first tether having a first end coupled to the first end attachment structure, and a second end structurally configured for coupling to an existing conductor at a location that is to a first side of the suspension insulator and spaced apart from the suspension insulator.

4. The tangent suspension bracket of claim 3 further including a second tether having a first end coupled to the second end attachment structure, and a second end structurally configured for coupling to the existing conductor at a location that is to a second side of the suspension insulator which is opposite the first side of the suspension insulator, and which is spaced apart from the suspension insulator.

5. The tangent suspension bracket of claim 1 wherein the central cap includes an inwardly concave surface, with the opening being centrally located thereon.

6. The tangent suspension bracket of claim 1 wherein the central cap is formed from a first bracket member and a second bracket member coupled to the first bracket member.

7. The tangent suspension bracket of claim 6 wherein the first bracket member includes a central cavity, a first side leg extending to one side thereof and a second side leg extending to an opposite side of the first side leg, and wherein the second bracket member includes a central cavity, a first side leg extending to one side thereof and a second side leg extending to an opposite side of the first leg, whereupon coupling, the central cavity of each of the first bracket member and the second bracket member defines the central cap.

8. The tangent suspension bracket of claim 7 further comprising a first side spacer positioned between the first side leg of the first bracket member and the first side leg of the second bracket member, and a second side spacer positioned between the second side leg of the first bracket member and the second side leg of the second bracket member.

9. The tangent suspension bracket of claim 8 further comprising a first side extension leg coupled to the first side spacer and a second side extension leg coupled to the second side spacer, wherein the first tether is sandwiched between the first side extension leg and the first side leg of the first bracket member and the second tether is sandwiched between the second side extension leg and the second side leg of one of the first bracket member and the second bracket member.

10. The tangent suspension bracket of claim 9 wherein the first tether is sandwiched between the first side extension leg and the first side leg of the first bracket member and the second tether is sandwiched between the second side extension leg and the second side leg of the first bracket member.

11. The tangent suspension bracket of claim 9 wherein the first tether is sandwiched between the first side extension leg and the first side leg of the first bracket member and the second tether is sandwiched between the second side extension leg and the second side leg of the second bracket member.

12. The tangent suspension bracket of claim 6 wherein the first bracket member is coupled to the second bracket member by way of a plurality of fasteners, each of which is extended through the first bracket member and into the second bracket member.

13. The tangent suspension bracket of claim 6 wherein the first bracket member is coupled to the second bracket member by way of a plurality of fasteners, one of which is extended through the first bracket member and into the second bracket member, and the other of which is extended through the second bracket member and into the first bracket member.

14. The tangent suspension bracket of claim 6 wherein the first bracket member and the second bracket member are substantially identical.

15. The tangent suspension bracket of claim 1 further comprising a secondary bracket assembly configured to retain a jumper conductor below an existing conductor.

16. The tangent suspension bracket of claim 15 further comprising a first side attachment structure extending from the central cap and spaced apart from the first end attachment structure and the second end attachment structure, and a second side attachments structure extending from the central cap in a direction opposite from the first side attachment, wherein the secondary bracket further comprises a hanger assembly coupled to each of the first and second side attachments and a clamp assembly coupled to a lower end of the hanger assembly, with the clamp assembly including a u-shaped bracket structurally configured to receive the jumper conductor therealong.

17. The tangent suspension bracket of claim 16 wherein the hanger assembly comprises a first side leg coupled at an upper end to the first side attachment structure and coupled to the clamp assembly at the lower end thereof, and a second side leg coupled at an upper end to the second side attachment structure and coupled to the clamp assembly at the lower end thereof.

18. The tangent suspension bracket of claim 17 wherein the existing conductor extends between the first side leg and the second side leg, and between the central cap and the clamp assembly of the secondary bracket assembly.

19. The tangent suspension bracket of claim 17 wherein the hanger assembly is pivotably coupled to the first side attachment and to the second side attachment and pivotably coupled to the clamp assembly.

* * * * *